United States Patent Office 3,799,810
Patented Mar. 26, 1974

3,799,810
FAST ACTIVATION RESERVE BATTERY
Richard A. Wallace, 43 Kingscote Garden,
Stanford, Calif.
No Drawing. Continuation of abandoned application Ser.
No. 83,764, Oct. 26, 1970. This application Sept. 14,
1972, Ser. No. 289,144
Int. Cl. H01m 21/14
U.S. Cl. 136—112  19 Claims

ABSTRACT OF THE DISCLOSURE

Fast activation reserve battery comprising a lead dioxide-zinc pulse cell that employs an immobilized electrolyte carried by a moisture-proof nitrocellulose and wax-coated cellulosic separator.

This is a continuation of application Ser. No. 83,764, filed Oct. 26, 1970, now abandoned.

BACKGROUND OF THE INVENTION

Field of invention

This invention relates to reserve batteries and more particularly to electrically actuated fast activation reserve batteries.

Description of prior art

Various types of reserve batteries often called "thermal batteries" have been provided which produce electrical energy of short duration upon the application of heat. The usual electrolyte for thermal batteries is a eutectic mixture of 45 weight percent LiCl and 55 percent KCl melting point 352° C. Operating temperature range is 375° C. to 550° C. for these thermal batteries. In general, however, these batteries or cells are very expensive and require a special dry room for fabrication of the same. They also are very inefficient electrochemically. In addition, they require temperatures during operation in excess of 300° C. There is, therefore, a need for a new and improved low-cost reserve battery or thermal cell.

SUMMARY OF THE INVENTION AND OBJECTS

The fast activation reserve battery consists of a plurality of porous bipolar electrodes comprised of a plurality of anodes and cathodes with the cathodes interspersed between the anodes. A plurality of separators are provided which are interspersed between the cathodes and the anodes to separate the cathodes from the anodes. The separators contain an electrolyte which is encapsulated therein to prevent the electrolyte from coming into contact with the anodes and the cathodes. Means is provided for at least partially destroying the separators to rapidly release and free the electrolyte to permit it to come into contact with the bipolar porous electrodes to thereby activate the battery.

In general, it is an object of the present invention to provide a reserve battery which can be readily activated to supply power for the operation of proximity fuses in projectiles.

Another object of the invention is to provide a reserve battery of the above character which can provide high, short duration current densities for a period of time ranging from 5 to 500 seconds.

Another object of the invention is to provide a reserve battery of the above character which is completely inactive prior to actuation and which has a long shelf life.

Another object of the invention is to provide a reserve battery of the above character which is capable of discharging at high rates over a wide range of ambient temperatures.

Another object of the invention is to provide a reserve battery of the above character for use in igniting fuses which can withstand vibration, acceleration and high spin during activation.

Another object of the invention is to provide a reserve battery of the above character which can be assembled in a conventional air conditioned room.

Another object of the invention is to provide a reserve battery of the above character which can be readily assembled and which is relatively low in cost.

Additional objects and features of the invention will appear from the following description in which the preferred embodiment is set forth in detail in conjunction with the accompanying drawing.

BRIEF DESCRIPTION OF THE DRAWING

FIG. 1 is an isometric view with certain parts broken away of a reserve battery incorporating the present invention.

FIG. 2 is a side elevational view, partially in cross-section, of the reserve battery shown in FIG. 1.

FIG. 3 is an enlarged cross-sectional view of the portion of the reserve battery encircled by the line 3—3 of FIG. 2.

FIG. 4 is a plan view of a typical support member utilized in the reserve battery.

DESCRIPTION OF THE PREFERRED EMBODIMENT

The electrically actuated fast activation reserve battery incorporating the present invention consists of one or more cells 11 in which each of the cells is comprised of bipolar electrodes in the form of an anode 12 and a cathode 13 with a separator 14 interposed between the anode and the cathode. The anode 12 and the cathode 13 of each cell 11 can be formed of any suitable material which is particularly adapted for use in reserve batteries. By way of example, it has been found that amalgamated zinc is very satisfactory for the anode 12, whereas lead dioxide is very satisfactory for the depolarizer or cathode 13. These materials which serve as the anode and cathode are carried by a U-shaped bipolar support member 16. The U-shaped support member 16 can have any desired configuration. However, in the present embodiment, as shown in FIG. 4 of the drawing, the U-shaped member is formed from a rectangular strip having a length "$l_1$" such as 3 inches and a width "$w$" such as one-half inch. The member 16 is formed of a suitable material such as size 40 mesh nickel or Inconel screen. The U-shaped member 16 serves as a support or carrier for the electrodes and it is desirable that it be formed of a material which is very corrosion resistant and also which is relatively inexpensive.

It is desirable that the electrodes, i.e. the anode 12 and cathode 13, be relatively porous for reasons hereinafter described. The anode 12 and cathode 13 are formed on opposite ends of the U-shaped bipolar member 16 over lengths represented by the length "$l_2$" before the member 16 has been bent into the "U" shape.

The cathode 13 is formed of a hard coating of lead dioxide which is deposited on one end of the rectangular screen which is to form the U-shaped member 16 so that the lead dioxide nearly fills the spaces in the screen thereby making a rigid electrode. In depositing the lead dioxide, an aqueous 35% by weight solution of lead nitrate at 50° C. was used for the plating operation. The reaction during plating is as follows:

$$2Pb(NO_3)_2 + 2H_2O \rightarrow Pb + PbO_2 + 4HNO_3$$

As can be seen from the above identified reaction, lead was deposited at the cathode and lead dioxide at the

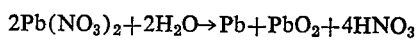

anode. The current density was varied from 5 to 20 milliamperes per cm.² for a period of time ranging from 2 to 4 hours. As the lead dioxide was produced on the member 16, the nitric acid produced was neutralized by small additions of lead dioxide to the plating bath.

After the depolarizer or cathode 13 has been formed on one end of the member 16, the anode 12 is formed on the other end of the member 16. This can be accomplished in a suitable manner such as by electrodepositing a thin layer of copper on the other end of the member 16. If desired, mercury can be used to amalgamate the copper. After the copper has been electrodeposited, zinc is then electroplated at a suitable temperature as, for example, 25° C. utilizing a conventional zinc plating bath consisting of 60 grams per liter of zinc cyanide, 23 grams of sodium cyanide and 53 grams of sodium hydroxide. Current densities used range from 10 to 100 milliamperes per cm.² for several minutes to 2 hours.

Alternatively, the opposite end of the nickel screen can have a zinc powder applied thereto which has previously been amalgamated. The amalgamation can be accomplished by utilizing small amounts of mercury to amalgamate the zinc powder at 50° C. In preparing this paste, it may be desirable to add a small amount of a carboxylmethyl cellulose "Methocel" binder. After the amalgamated zinc powder has been applied to the screen, it may then be air dried at a suitable temperature as, for example, 90° C.

As a replacement for the amalgamated zinc, magnesium can be utilized which will result in a higher cell voltage. The magnesium anode can be prepared by several conventional techniques. For example, magnesium can be vapor deposited on the screen. The support member is placed in a boat having a temperature of 450° C. and magnesium was evaporated at a rate of $1 \times 10^{-4}$ grams per cm.²/sec. The vapor pressure was 10 microns of Hg in an evacuated chamber.

Another alternative is to press 5 mil magnesium sheet at a suitable pressure as, for example, 25,000 p.s.i. into the nickel wire mesh.

After the anode and cathode have been formed on the member 16, it is bent in the form of a "U" as shown in the drawing with the anode 12 on one end of the member serving as one leg of the U-shaped member and the cathode 13 serving as the other end of the U-shaped member. The intermediate portion of the U-shaped member having a length "$l_3$" is uncoated and merely serves as a connection between one side of the anode and one side of the cathode. The connection between the anode and the cathode is provided to eliminate the necessity of interconnecting the same in the event that it is desirable to utilize a plurality of the cells in a reserve battery.

It also should be appreciated that the U-shaped member can have any desired configuration. For example, the portion interconnecting the anode and the cathode could be necked down if desired. It also should be appreciated that, if desired, the anode 12 and the cathode 13 can be formed as separate members and thereafter interconnected by wire or other suitable means. It also can be readily appreciated that depending upon the geometry desired for the reserve battery that configurations other than rectangular can be utilized for the U-shaped member. For example, the anode 12 and the cathode 13 could be formed on separate circular screen members.

In cross-section, the U-shaped member 16 has the appearance of a hairpin. The upper end of the U-shaped member 16 is open and there is a space 17 provided between the anode and the cathode in which there is disposed the separator 14. The separator 14 carries the electrolyte 18 for the cell 11. The separator 14 must be capable of forming an enclosure for the electrolyte and must be formed of a high-wet strength cellulosic material which is acid-resistant, moisture-proof, and which is highly combustible. One separator 14 found to be particularly suitable consisted of an acid-resistant parchment sheet 21, such as either brown wrapping paper or waxy wrapping paper, or parchment paper which carries a coating 22 on its exterior surface. The coating 22 is a high melting (above 75° C.) nitro-cellulose-wax composition having a thickness ranging from 0.5–2 mils. The composition can be applied to both sides of the sheet 21 by dipping the sheet into a solution of low-viscosity (below 50 centipoises) cellulose nitrate-wax mixture a number of times and letting it dry after each dip until the desired thickness is reached. Alternatively, the composition can be sprayed or painted onto both sides of the sheet 21. By way of example, the composition could consist of by weight.

| | | Composition range |
|---|---|---|
| Nitrocellulose | 15 | (12–20) |
| Wax | 30 | (20–35) |
| Solvent combination | 50 | (40–65) |
| Plasticizer | 5 | (4–10) |

The nitrocellulose is of a soluble pyroxylin grade containing 11.5 to 12.4 percent nitrogen which is readily available and is highly flammable. The wax which is utilized, in addition to having a high melting temperature, should burn readily. Suitable natural waxes are refined Carnauba and Reibeck Montan. Synthetic waxes which are suitable are Abril Wax I, Acrawax B, Inkowax 1226, Paradox wax, and Cerita 27. The plasticizer can be camphor or a phosphate plasticizer. When the composition modified with the tricresyl or dibutyl phthalate plasticizer, the composition may be readily applied by brushing or spraying. The solvent combination is comprised typically of toluene and a ketone or ester solvent such as methyl ethyl ketone or ethyl and butyl acetate. Specifically, the solvent composition could be: toluene 50% by volume, butyl acetate 30% by volume, and butanol 20% by volume. To increase the electrical resistance of the composition applied as an overcoating, small amounts up to 3% of polystyrene can also be incorporated in the solution used for the composition.

In making the composition, the nitrocellulose and wax are mixed together and then dissolved in the solvent to form a lacquer to which is added the plasticizer to give the coating which is formed more flexibility and durability. This composition which is applied to the paper film is very flammable and, in addition, it has the characteristic that it can be heat sealed to itself with conventional commercial impulse heat sealing equipment.

After the coating 22 has been formed on the sheet 21, the sheet 21 is cut to the proper size. By way of example, it is cut to form either one piece or two pieces which are generally rectangular in shape. If cut to provide one piece, the piece would have a length slightly greater than twice the length of one of the legs of the U-shaped member 16 or if cut to provide two pieces, each of the two pieces would have a length slightly greater than one of the legs of the U-shaped member 16 and would have at least as great a width as the width of the U-shaped member. If one piece is utilized, the piece would be folded in half and the two sides would be heat sealed by the use of conventional heat sealing equipment leaving the top side open. The electrolyte 18 would be then placed in the top side and it would be sealed. If two pieces are utilized, they would be heat sealed together around three edges and the top side again would be left open. The electrolyte would be introduced into the open side and then the open side would be heat sealed to encapsulate the electrolyte therein. The heat sealed margins of the separator 14 are indicated at 14a.

The electrolyte 18 which was utilized was either immobilized sulphuric acid ($H_2SO_4$) or viscous phosphoric acid ($H_3PO_4$). The immobilized sulphuric acid was made by taking dilute sulphuric acid having a specific gravity of 1.10 and forming it into a very viscous paste or gel. The paste or gel can be formed either by a physical method or by a chemical method. Phosphoric acid ranging from 30 to 65 percent also was used as the electrolyte 18. Wherever desired, small amounts of hydrochloric acid (HCl) up to 2 percent were added to the viscous phosphoric acid to increase its electrical conductivity. The physical method consists of adding small amounts of commercial carboxylmethylcellulose ranging from 2 to 6 percent by weight and incorporating it in the dilute sulphuric acid or viscous phosphoric acid to gel it.

The chemical method consists of utilizing common thixotropic agents such as "Cav-O-Sil" in amounts ranging from 4 to 10 percent or Kaolin clay in amounts ranging from 5 to 12 percent. Another chemical method is to take two parts per volume of dilute sulphuric acid of a specific gravity of 1.15 and adding it to one part by volume of sodium silicate solution of specific gravity of 1.2. Within 40 to 60 minutes, the jelly acid thickens and final setting occurs within approximately 5 minutes. The greater the percentage of sodium silicate in proportion to the dilute sulphuric acid, the more quickly the gel sets. Utilizing three parts by volume of dilute sulphuric acid, having a specific gravity of 1.08, to one part per volume sodium silicate solution, having a specific gravity of 1.2, a jelly acid forms in 90 to 110 minutes.

In the embodiment of the reserve battery shown in the drawing, a plurality of the cells 11 have been provided in which they have been connected in series by connector bars 24. Thus, a connector bar 24 connects the cathode of one cell to the anode of an adjacent cell. The connector bar 24 can be formed of a suitable material such as nickel and can be secured to the cells by suitable means such as spot welding. In this way, it is possible to provide a plurality of serially connected cells as, for example, 15 cells to obtain the desired voltages. It is desirable that there be no direct physical contact between the anode of one cell and the cathode of another cell. For this purpose, thin sheets 25 of a suitable insulating material such as polyethylene are disposed between the cells as shown in FIG. 3. If the series connected cell structure is sufficiently rigid to maintain the desired spacing, the sheets 25 can be omitted. Also if desired, small blocks of insulating material can be used in place of the sheets 25. The insulating sheet of the plastic can be perforated or, alternatively, in the form of woven mesh fabric.

The plurality of stacked cells 11 are mounted in a suitable case 26 formed of a suitable insulating material. Since the reserve battery does not contain lithium chloride, it can be assembled in a conventional room or factory. The case 26 can be formed of a molded epoxy plastic.

As can be appreciated, the case 26 can have any desired configuration as, for example, the box-like configuration shown in FIG. 1 for a cylindrical button shape. The case 26 is provided with several small vents 27 for venting gas from the battery. The case is also provided with output leads in which the lead 28 is the positive terminal and lead 29 is a negative terminal.

Means is provided for actuating the battery and includes a pair of input leads 31. The input leads 31 are connected to a suitable electrically actuated firing device 32 conventionally called an electric match or squib which can be actuated from an external electrical signal. The source of power for the squib can be a charged capacitor. The electric match 32 is positioned in the lower part of the case 26 adjacent the lower extremities of some of the cells 11 at one end of the battery. The electric match 32 is adapted to ignite pryotechnic paper or powder 33 of a conventional type which is disposed along the bottom wall of the case 26 and adjacent the lower extremities of the cells 11 along the entire length of the battery as shown particularly in FIG. 2. The pyrotechnic paper or powder comprises a readily oxidizable metal powder, such as, for example, zirconium, which reacts with a nongaseous oxidizing agent, such as barium chromate or manganese dioxide also incorporated in the pyrotechnic mixture. These combustible heat powders or paper or cartridge are commercially available from Catalyst Research Corp., Baltimore, Md. and Eureka-Williams, Bloomington, Ill.

Operation and use of the reserve battery may now be briefly described as follows. Let is be assumed that the reserve battery has been installed in an apparatus or device in which it is desired to actuate the reserve battery. This is accomplished electrically by supplying an electrical signal to the input terminal 31 to cause operation of the electric match 32. This causes immediate ignition of the pyrotechnic paper 33 at the bottom of the battery to cause substantially simultaneous ignition along the entire length of the battery of the coatings carried by the separators 14. As pointed out previously, the coatings 22 are highly flammable. Therefore, the flame front propagates very rapidly throughout the battery. The nitrocellulose burns very rapidly and ignites the paper or film which is utilized. The wax also burns. This burning will take place very rapidly even in the absence of air within the battery. The burning which takes place within the battery generates heat within the battery which is particularly useful in obtaining reliable operation of the battery when the battery has been frozen or is being utilized in very low temperature environments. In addition, this generated heat increases the fluidity of the acid jelly by reducing its viscosity in accordance with its rise in temperature. Since the sheet 21 and the coating 22 thereon which form the enclosure for the electrolyte of each separator 14 are rapidly consumed as soon as the electrical activation signal has been supplied to the battery, the electrolyte 18 contained within the separators 14 is rapidly released and comes into contact with the relatively porous and grid-like anodes and cathodes 13 of the cells 11.

As soon as the sulphuric acid reaches the anodes and the cathodes, an open circuit potential of approximately 2.5 volts is obtained for each lead dioxide-zinc cell. The current producing reaction is

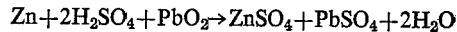

$$Zn + 2H_2SO_4 + PbO_2 \rightarrow ZnSO_4 + PbSO_4 + 2H_2O$$

When magnesium was utilized as an anode rather than zinc, the open circuit potential of each cell was approximately 3.1 volts. The current producing reaction for such a cell is

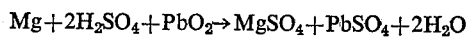

$$Mg + 2H_2SO_4 + PbO_2 \rightarrow MgSO_4 + PbSO_4 + 2H_2O$$

During discharge of such a reserve battery, it was found that the evolved gases escaped through the vents 27. To reduce hydrogen evolution during discharge, large amounts up to 1 molar of $MgSO_4$ was added to the immobilized sulphuric acid before introduction into the separator 14.

It has been found that the reserve battery of the present invention can be actuated in times ranging from 50 to 700 milliseconds. High, short duration current densities up to 125 milliamperes per cm.² at 2.3 volts per cell have been produced. Battery life ranging from 5 to 500 seconds can be readily obtained. The reserve battery was capable of discharging at high rates over a wide range of ambient temperatures ranging from —54° C. to 74° C. This is possible because the cells give off heat upon activation. The reserve batteries can also withstand high vibration and high spin conditions. The reserve batteries can be activated while under high spin because of the use of immobilized sulphuric acid or phosphoric acid. The immobilization of the sulphuric acid or phosphoric acid prevents the acid from shifting from one side of the battery to the other.

By way of example, a battery constructed in accordance with the teaching of the present invention consisted of 15 zinc-lead dioxide cells which were stacked in series to provide a nominal battery voltage of 34 volts. The battery had dimensions of one-half inch high by one-half inch long by one-half inch wide and an approximate weight of 4.5 ounces. The approximate volume required for the battery was 1.1 cubic inches or 18.7 cubic cm.

The reserve battery is inexpensive because relatively inexpensive materials have been utilized for the battery. The reserve battery can be assembled in conventional rooms and does not require the use of a special dry room. In addition, the construction of the battery is relatively simple. The cathodes and anodes are formed from U-shaped members which can be readily stacked. In addition, the separators can be readily placed within the U-shaped members.

It is apparent from the foregoing that there has been provided an electrically actuated fast activation reserve battery which is capable of delivering a large burst of electrical energy on activation. Because it can be activated upon high spin conditions, it has applications in ordnance projectiles and missiles as the primary source of power for proximity fusing of non-spin as well as high spin projectile rounds. It should be appreciated that, if desired, the reserve battery can also be fired mechanically by the use of a percussion cap. Because of the construction of the battery, the battery requires much less internal thermal insulation than conventional reserve baeries. It also requires less pyrotechnic paper for heating the battery.

From the foregoing, it can be seen that there has been provided a reserve battery which is completely inactive prior to actuation but which rapidly reaches full operating potential after ignition. The reserve battery is relatively light-weight and should have unlimited shelf life if kept in a relatively dry condition. The wax in the coating which is utilized in the separators serves to make the separators 14 very waterresistant.

What is claimed is:

1. In a reserve battery, a case, at least one cell disposed in the case, each cell being comprised of an anode and a cathode and a separator formed solely of insulating materials which are highly flammable disposed between the anode and cathode, said separator being formed of a moisture-proof acid resistant cellulosic material, said material including a combustible sheet and a coating including nitro-cellulose carried by the sheet, said separator carrying an immobilized electrolyte and means within the case for destroying said separator by flame to rapidly release the immobilized electrolyte therefrom to activate the cell.

2. A battery as in claim 1 wherein said separator is in the form of an envelope having a space therein and wherein said electrolyte is in the form of a viscous mass.

3. A battery as in claim 1 wherein said case is provided with openings to permit the escape of any gases created during activation of the battery.

4. A battery as in claim 1 wherein said cathode is formed of lead dioxide.

5. A battery as in claim 1 wherein said anode is formed of amalgamated zinc.

6. A battery as in claim 1 wherein said anode is formed of magnesium.

7. A battery as in claim 1 wherein the cathode and anode are each in the form of a porous screen or grid so as to facilitate contact between the electrolyte when it is released from the separator.

8. A battery as in claim 7 wherein the grid is formed of a screen of an acid-resistant material and wherein the grid serving as the cathode has lead dioxide deposited on the screen and wherein the anode has amalgamated zinc deposited on the screen.

9. A battery as in claim 8 whrein the anode has amalgamated zinc deposited on the screen.

10. A battery as in claim 7 wherein said grids for the cathode and anode of each cell are formed from a unitary member, wherein the cathode material is deposited on one end of the member and the anode material is deposited on the other end of the member, wherein the member has been bent so that it has a substantially U-shaped appearance in cross-section with a space between the ends carrying the anode and the cathode material and wherein the separator is disposed in the space.

11. A battery as in claim 1 wherein said coating includes a wax having a relatively high melting temperature for moisture proofing the separator.

12. A battery as in claim 11 wherein said coating includes a plasticizer.

13. A battery as in claim 2 wherein the separator is heat sealable to itself to facilitate the formation of an envelope.

14. A battery as in claim 1 wherein said case is formed of a plastic material.

15. A battery as in claim 1 wherein said means for destroying at least a portion of the separator includes electrically operated means for providing a flame, and pyrotechnic paper disposed within the case below the cells for supplying the flame from the electrically actuated means to the separators of the cells.

16. In a reserve battery, a case, a plurality of cells disposed in the case, each cell being comprised of an anode and a cathode, an electrolyte, means enclosing said electrolyte so that it is kept out of contact with said anode and cathode of each cell, said means enclosing said electrolyte being formed of a moisture proof, acid-resistant cellulosic material, said material comprising a combustible sheet-like member and a coating including nitro cellulose carried by the sheet-like member, and means within the case for creating a flame to cause destruction of said means enclosing the electrolyte by flame propagation to rapidly release the electrolyte contained therein to thereby activate the cells in the case.

17. A reserve battery as in claim 16 which can be activated within a time ranging from 50 to 700 milliseconds.

18. A battery as in claim 16 wherein said electrolyte is an immobilized electrolyte.

19. A battery as in claim 16 wherein said means encapsulating the electrolyte is formed in a separate envelope containing electrolyte and wherein one of the envelopes is disposed in each cell between the cathode and the anode of the cell.

References Cited

UNITED STATES PATENTS

| 3,454,430 | 7/1969 | Gruber | 136—114 X |
| 3,440,106 | 4/1969 | Bakan et al. | 136—114 |
| 3,304,202 | 2/1967 | Sam | 136—114 X |
| 3,419,430 | 12/1968 | Michaels | 136—26 |
| 3,582,405 | 6/1971 | Jerabek et al. | 136—114 |
| 3,518,125 | 6/1970 | Fishbach | 136—90 |
| 3,589,947 | 6/1971 | Maxel et al. | 136—90 X |

ALLEN B. CURTIS, Primary Examiner

C. F. LeFEVOUR, Assistant Examiner